Jan. 16, 1923.
L. C. SCHNEIDER.
TRAP.
FILED JUNE 8, 1921.
1,442,450
2 SHEETS-SHEET 1
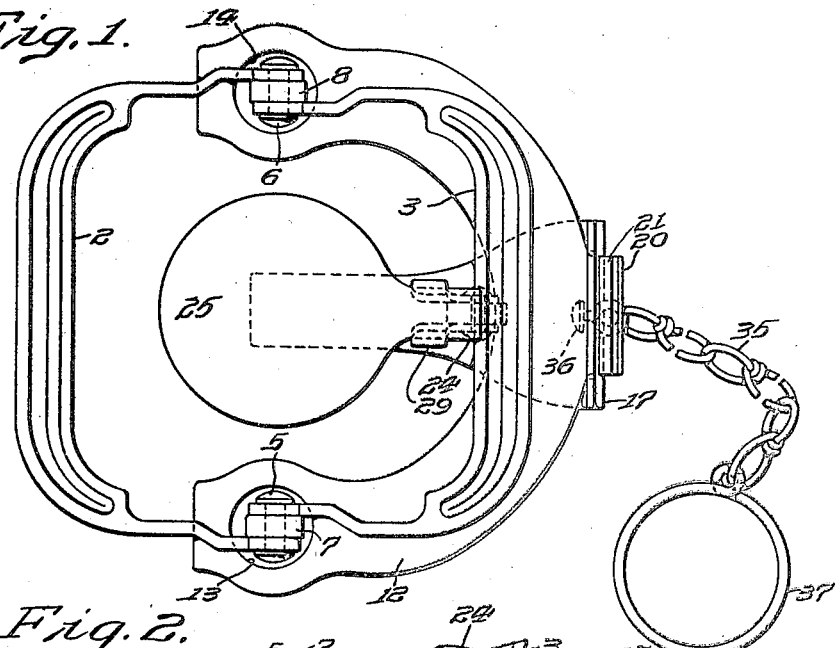
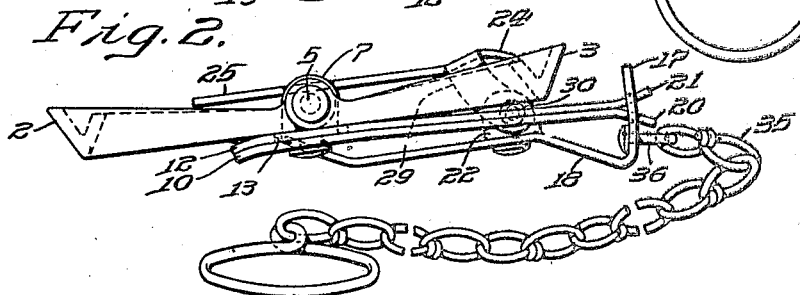
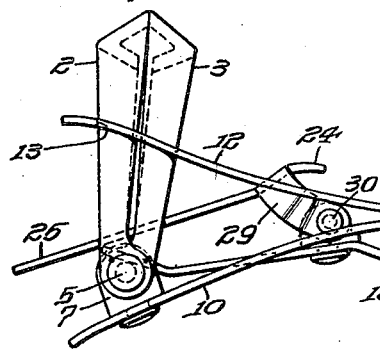
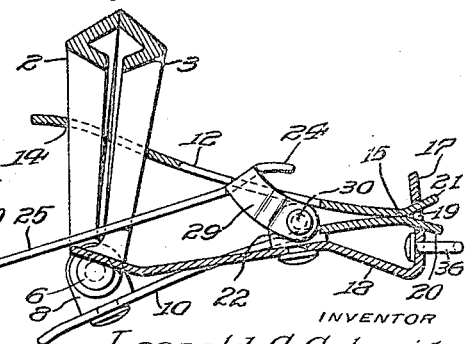
WITNESS
F. J. Hartman
INVENTOR
Leopold C. Schneider
BY
ATTORNEYS Jan. 16, 1923.
L. C. SCHNEIDER.
TRAP.
FILED JUNE 8, 1921.
1,442,450
2 SHEETS-SHEET 2
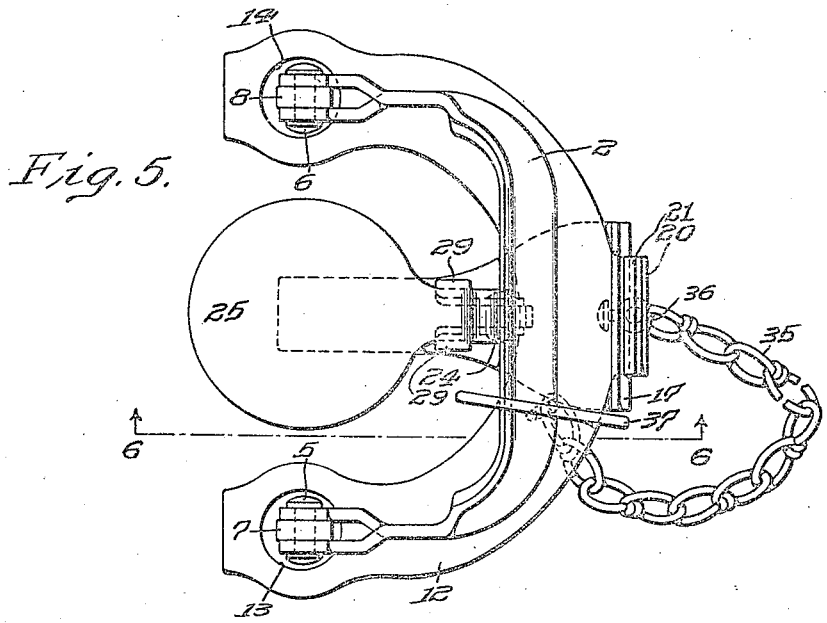
Fig. 5.
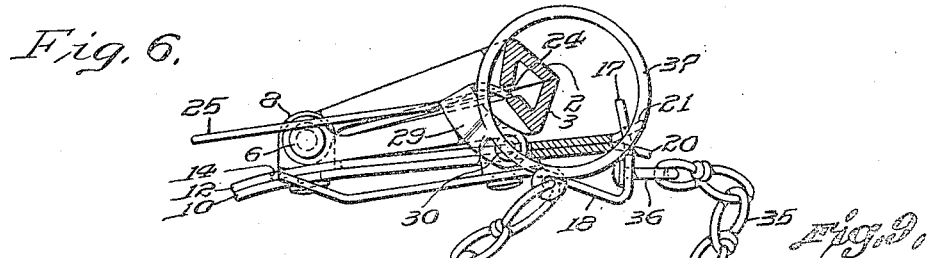
Fig. 6.
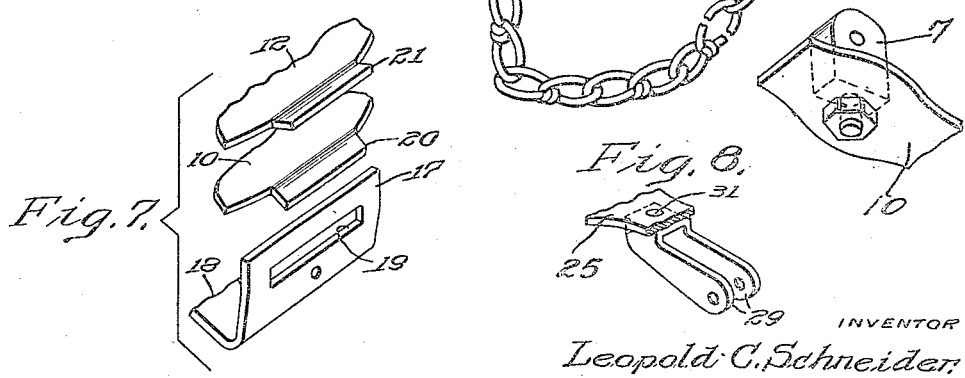
Fig. 7. Fig. 8.
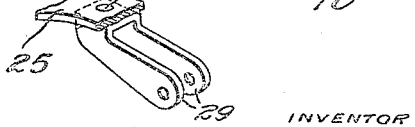
INVENTOR
Leopold C. Schneider.
BY
ATTORNEYS
WITNESS Patented Jan. 16, 1923.

1,442,450

UNITED STATES PATENT OFFICE.

LEOPOLD C. SCHNEIDER, OF GLENSIDE, PENNSYLVANIA.

TRAP.

Application filed June 8, 1921. Serial No. 475,863.

*To all whom it may concern:*

Be it known that I, LEOPOLD C. SCHNEIDER, a citizen of the United States, and a resident of Glenside, in the county of Montgomery and State of Pennsylvania, have invented certain new and useful Improvements in Traps, of which the following is a specification, reference being had to the accompanying drawings.

Among the principal objects of my invention is to provide an animal trap of compact form and simple construction comprising a double spring, that is, a spring simultaneously cooperative with both sides of the jaws, which may be manufactured in all the usual commercial sizes, as hitherto the employment of a double spring in the usual forms of traps has been restricted to the larger sizes, it having been found impracticable to utilize such springs in the smaller sized traps. My invention further contemplates the employment of two springs in superposed relation and adapted when the trap is sprung to simultaneously move in opposite directions, thereby effecting a very rapid and effective closure of the jaws, said springs being unconnected with each other but securely maintained in the requisite operative relation by a novel form of retaining means.

Still further objects of my invention are to provide an animal trap in which the means operative to hold the jaws of the trap in open or set position are greatly simplified over the means hitherto employed for that purpose and in which the dog carried by and movable with the pan or pedal is directly cooperative with the jaw, thereby entirely eliminating the use of the usual overhanging trigger, and to provide a trap in which both jaws are mounted on the same pivots and revolve about the same axis thereby permitting one jaw to be folded over on the other and secured in convenient position for the transportation of the trap as hereinafter more fully explained.

My invention further contemplates the general simplification of traps and the component parts thereof and the arrangement of the various elements so as to minimize the possibility of the trap becoming inoperative through freezing or the accumulation of snow or other foreign matter; the arrangement of the several parts so as to facilitate the setting of the trap and the designing thereof in such manner as to lend to economical manufacture and negative as far as possible liability of breakage or disarrangement through rough or careless handling under conditions of use.

My invention further includes all of the other various objects and novel features of construction and arrangement hereinafter more definitely specified and described, and in certain respects constitutes an improvement upon the trap forming the subject of an application for Letters Patent of the United States Serial No. 441,546 filed by me February 1, 1921.

In the accompanying drawings I have illustrated a preferred embodiment of my invention. Fig. 1 being a plan view of the trap in open or set position and Fig. 2 a view thereof in end elevation. Fig. 3 is a view in end elevation of the trap in sprung position and Fig. 4 a similar view partially in central vertical section and partially in elevation, while Fig. 5 is a top plan view with the free jaw folded down upon the other jaw into a convenient position for carrying, the ring at the end of the trap chain being slipped over the jaws and springs to hold the former in place against the compression of the springs irrespective of the position of the detent dog carried by the pan or pedal and Fig. 6 is a view in vertical section substantially on the line 6—6 in Fig. 5 looking in the direction of the arrows. Fig. 7 is a fragmentary detail perspective view showing certain elements of the trap prior to assembling and Figs. 8 and 9 are fragmentary perspective detail views showing slightly modified manners of constructing certain of the parts. Like numerals are used to designate corresponding parts in the several figures.

In the form shown in the drawings the trap comprises a pair of complementary oppositely disposed jaws 2 and 3 the former being hereinafter referred to as the free jaw. These jaws may be of any suitable form for example substantially as shown, that is, relatively straight at the middle and thence curved inwardly in opposite directions to form substantially parallel ends. The ends of one of the jaws, for example the free jaw, are outwardly offset and the ends of the other jaw inwardly offset, while the several ends are provided with suitable apertures for the passage of horizontally disposed pivots 5 and 6 which also extend through suitable apertures in the upper, preferably transversely flattened ends of the jaw supports 7 and 8, the ends of the pivots being headed over or other means employed to prevent longitudinal displacement of the pivots. It will be evident that the offsetting of the jaws adjacent the pivots is effective to permit the main portion of the jaws to rest in alignment with each other when the jaws are closed as in Figs. 3 and 4 while permitting the free jaw to be folded over on top of the other jaw into the position shown in Figs. 5 and 6 when desired.

The pivot supports are positioned adjacent and carried by the outer ends of the lower spring 10 which is formed of spring steel or other tempered sheet metal ordinarily by a stamping or similar operation and is preferably generally crescent shape in planary outline so as to follow in a general way the configuration of the jaws although of considerably greater transverse width at any given point than is the jaw at a corresponding point. The pivot supports are rigidly secured to the spring preferably by extending a portion of each support through an aperture in the spring and heading it over on the under side thereof, or if desired instead of heading over such portion of the support it may be provided with threads and a nut threaded thereon and drawn up against the under side of the spring as shown in Fig. 9, thus facilitating the removal of the support if required.

Positioned above the lower spring 10 is an upper spring 12 preferably substantially similar to the lower spring in planary outline and similarly formed of spring steel or other tempered sheet metal, the outer ends of this spring being provided with orifices 13 and 14 through which the jaws extend, the size of these orifices being such that their opposite edges will engage the outer sides or edges of the jaws when the trap is sprung and the spring in its normal or relaxed position as best shown in Fig. 4, the width of the orifices being sufficient to permit them to readily pass over the extremities of the pivots 5 and 6 during the operation of setting the trap as well as during the closing movement of the jaws. Preferably in order to provide sufficient metal adjacent the orifices the spring is widened in their vicinity and if desired the lower spring 10 may be correspondingly widened in the vicinity of the pivot supports. The upper spring is flared or curved upwardly from its center toward its ends and the lower spring correspondingly curved or flared downwardly from its center toward its ends so that when the springs in the assembled trap are in normal or relaxed position they will rest upon each other at a point 15 adjacent their extreme rear edges while their forward or free ends will be relatively widely separated as in Figs. 3 and 4, in which position neither spring will be under any appreciable tension. Preferably the extreme outer ends of both springs are bent slightly downwardly on corresponding curves.

Means are provided for maintaining the springs in operatively assembled relation which preferably comprise an upwardly turned lug 17 formed adjacent the rear end of the trap base 18 and provided with a transversely extending slot 19 which is adapted to receive the lugs 20 and 21 respectively formed integrally with the springs and extending outwardly from the rear edges thereof. The lug 20 on the lower spring is directed slightly angularly downward from the plane of the center of the spring and the lug 21 on the upper spring correspondingly directed angularly upward in such manner that when the trap is being assembled the lugs may be brought together in substantially parallel relation and inserted through the slot 19 to partially project beyond the rear face of the lug 17. The free ends of the springs are then moved toward each other until they attain substantially the position shown in Figs. 3 and 4 after which the jaws are passed through the apertures 13 and 14 and secured to the pivot supports, thereby bringing the lower and upper surfaces of the lugs 20 and 21 respectively against the lower and upper edges of the slot 19, the oppositely angular disposition of the lugs thereafter preventing the springs from becoming disengaged from the base so long as the jaws remain secured to the pivot supports and thereby prevent a sufficient separation of the free ends of the springs to permit the withdrawal of the lugs from the slot.

The base 18, which is preferably made of sheet metal, is conveniently directed angularly upward and rearward from the bottom of the lug 17 for a suitable distance and thence rearwardly to terminate at any convenient point, this base serving as a support for the pan pivot lug 22 which is riveted or otherwise secured to the base at a suitable distance in front of the lug 17 and preferably on the center line of the trap.

Means are provided for holding the jaw 3 in substantially parallel relation with the compressed springs when the trap is set, said means conveniently comprising a detent dog 24 preferably formed integral with the pan or pedal 25 and preferably cooperative directly with the jaw 3, the position of the dog being controlled by the position of the pan or pedal on which the animal steps to spring the trap. The pedal and dog are pivotally supported in any suitable way upon the pivot support 22, preferably by providing a pair of forwardly and downwardly extending, laterally spaced ears 29 conveniently formed integral with the pan and dog and adapted to extend on each side of the pivot support 22, to which the ears are movably connected by a transversely extending pivot 30, the position of the pivot with relation to the dog and the inner edge of the jaw 3 being such that when the jaw is depressed to set position the end of the dog may be engaged with the edge of the jaw to retain the jaw therein against the resistance of the springs until a pressure is applied to the pan sufficient to move the ears slightly about the pivot 30 and release the dog from engagement with the jaw. It will of course be understood that the several parts just described are so proportioned and adjusted that a relatively slight pressure on the pan is sufficient to release the dog and that while I prefer to utilize a jaw of substantially V-shaped transverse section such as is more fully described and claimed in my said application Serial No. 441,546 filed February 1, 1921 and to arrange the dog to engage the inner edge of the jaw as shown, that other forms of jaws may be employed if desired, in which case the dog will preferably be arranged to engage any convenient point thereof to hold the jaw in set position. If desired, instead of forming the ears integrally with the pan, they may be formed separately therefrom and rigidly secured thereto by a rivet 31 or in any other suitable manner, as shown in Fig. 8.

For the purpose of securing the trap to a log, stake or the like I preferably provide the same with a chain 35 attached at one end to the trap by means of swivel 36 which extends through an aperture in the lug 17 and is headed over on the inner side of the lug, the other end of the chain being provided with a ring 37 of a suitable diameter to be slipped over the free ends of the springs and for a considerable distance up over the jaws when the free jaw is folded over upon the other jaw and the latter is in set position as best shown in Figs. 5 and 6. Thus, when desired, the jaw 3 may be depressed into set position and the dog 24 engaged therewith, after which the free jaw 2 may be folded over against the jaw 3 and both jaws secured in position by slipping the ring over them and the springs. The trap may in this manner be reduced to very compact form for transportation or shipment and all danger of injury to the operator prevented, for even though the pedal be struck and the dog thus released from the jaw the engagement of the ring with the jaws and springs serves to limit relative movement between these parts and restrains the jaws from accidentally springing up to closed position. This feature is one of marked importance especially in the case of traps of large size the springs of which are so powerful as to require some means other than manual for their compression in setting the trap, thus making it necessary in the forms of traps generally in use at the present time to carry to the place where the trap is to be set some form of mechanical means for setting it. With my improved trap, however, this difficulty is obviated for the trap may be set by the use of any suitable mechanical means at any convenient point, the free jaw folded down, the ring slipped into position to hold the jaws and spring together and the trap then transported without danger to the operator to the place where it is to be set, after which the ring can be moved, the free jaw folded back to the position shown in Fig. 2 and the trap thus placed in condition for use.

It will be observed that in the operation of setting the trap which may be conveniently performed (unless some form of mechanical compressing means is required due to the size of the trap) by laying the trap on a smooth surface on which it will be supported by the outer ends of the lower spring 10 and the portion of the base adjacent the lug 17 and then depressing the upper spring with the feet until the lower jaw 3 can be folded down substantially parallel with the springs and the dog brought into engagement therewith, the springs are in reality caused to approach each other by respective movements through substantially similar arcs until when the trap is set they are in contact or nearly in contact over substantially their whole area. Conversely, when the trap is sprung the springs move apart in opposite directions, the upper spring traveling up along the jaws and the lower spring simultaneously pulling the jaws down through the apertures in the upper springs, the contact of the sides of the apertures with the edges of the jaws forcing the jaws together until they are brought into contact with each other or with some object, such as the foot of an animal, positioned between them. In either case since the plane of the upper spring at its point of contact with the jaws is, when the latter are closed or nearly closed, substantially at right angles to the general direction in which the sides of the jaws extend, it is very difficult, if not impossible, to open the jaws by pulling them apart without a simultaneous depression of the spring, so that the chance of an animal caught in the trap being able to pry the jaws apart sufficiently to release its foot is substantially eliminated. Moreover, owing to the simultaneous movement of separation of the springs in opposite directions when the trap is sprung, a very rapid closure of the jaws is effected and as there is no trigger extending over either of the jaws, as is the case in many forms of traps, the closing movement is entirely unimpeded, so that no matter how or from what direction the animal steps on the pan the operation of the trap is the same and the liability of the animal's foot being thrown out by the forcible displacement of the trigger, which is constantly present in the forms of traps in which the trigger is employed, is entirely obviated. Additionally, since the springs are maintained in operative position without the use of rivets or other means which might tend to weaken the springs, the likelihood of spring breakage is minimized and as all of the parts are of the simplest form and can in most instances be manufactured by a stamping operation the several parts of the trap may be constructed at a relatively low cost and readily assembled without excessive labor.

While I have herein described with considerable particularity a preferred embodiment of my invention, I do not thereby desire or intend to limit myself to any precise details of construction or arrangement of parts, as suitable changes and modifications may be made therein and the particular form of jaw employed may be varied as desired without departing from the spirit and scope of the invention as defined in the appended claims.

Having thus described my invention, I claim and desire to protect by Letters Patent of the United States:

1. An animal trap comprising a pair of complementary jaws, a pair of oppositely movable springs each having free laterally spaced ends operatively positioned one above the other, means including an integral portion of each spring for maintaining said springs in operatively assembled relation, one of said springs being adapted to support said jaws and the other of said springs having openings through which said jaws are arranged to extend, and releasable means for holding one of said jaws in fixed position against the compression of said springs.

2. In an animal trap, the combination of a pair of substantially crescent shaped springs capable of relative movement in opposite directions positioned one above the other, means for holding said springs in operatively assembled relation, and a pair of complementary jaws extending through apertures in the uppermost spring and pivotally supported on the lower spring.

3. An animal trap comprising a pair of substantially crescent shaped springs capable of relative movement in opposite directions positioned one above the other, means including an integral portion of each spring for holding said springs in operatively assembled relation, a pair of complementary jaws extending through apertures in the uppermost spring and pivotally supported on the lower spring, and releasable means for retaining one of said jaws in substantially parallel relation with said springs when in a state of compression.

4. In an animal trap, the combination of a pair of substantially crescent shaped springs positioned one above the other, said springs normally contacting at their centers and respectively flaring upwardly and downwardly therefrom, means for retaining said springs in operatively assembled relation, and a pair of complementary jaws supported on one of said springs and extending through apertures in the other of said springs.

5. In an animal trap, the combination of a pair of springs positioned one above the other, each spring provided with a rearwardly extending lug, a base comprising an upwardly extending lug having a slot adapted to receive the lugs on said springs, and a pair of complementary jaws supported on the lowermost spring and extending through apertures in the uppermost spring.

6. An animal trap comprising a pair of substantially crescent shaped springs positioned one above the other and each provided with a rearwardly extending lug, the uppermost spring normally flaring upwardly from adjacent its lug toward its free ends and the lowermost spring normally flaring downwardly from its lug toward its free ends, a base comprising an upwardly extending lug having a slot adapted to receive the lugs on said springs, a pair of complementary jaws supported on the lowermost spring and extending through apertures in the uppermost spring, and releasable means for holding one of said jaws in fixed position against the compression of said springs when the free ends thereof are compressed together.

7. In an animal trap, the combination of a pair of substantially crescent shaped springs disposed one above the other and normally flaring in opposite directions, each of said springs having a rearwardly extending lug angularly disposed with respect to the plane of the spring adjacent the lug, a base provided with a transversely extending slot adapted to receive the lugs on said springs, and a pair of complementary jaws pivotally supported on the lowermost spring adjacent the free ends thereof and extending through apertures in the uppermost spring.

8. An animal trap comprising a pair of substantially crescent shaped springs disposed one above the other, said springs normally contacting near their centers and respectively flaring in opposite directions from their point of contact, each of said springs having a rearwardly extending lug angularly disposed with respect to the plane of the spring adjacent the lug, a base having a lug provided with a transversely extending slot adapted to receive the lugs on said springs, a pair of complementary jaws pivotally supported on the lowermost spring adjacent the free ends thereof and extending through apertures in the uppermost spring, and releasable means for holding one of said jaws in fixed position against the compression of said springs when said springs are compressed together and comprising a pivoted dog directly cooperative with said jaw.

9. An animal trap comprising a pair of substantially crescent shaped springs disposed one above the other, said springs normally contacting near their centers and having their free ends flared in opposite directions, each of said springs having a rearwardly extending lug angularly disposed with respect to the plane of the spring adjacent the lug, a base having a lug provided with a transversely extending slot adapted to receive the lugs on said springs, a pair of complementary jaws pivotally supported on the lowermost spring adjacent the free ends thereof and extending through apertures in the uppermost spring, and releasable means for holding one of said jaws in fixed position against the compression of said springs when said springs are compressed together and comprising a movable pan pivotally supported on the base between the ends of said springs and a dog movable with said pan and adapted to directly engage said jaw.

10. An animal trap comprising a pair of separate springs each having spaced ends, means for supporting said springs in operative position one above the other, a pair of complementary jaws extending through apertures in one of said springs and pivotally supported on the other of said springs, and releasable means for holding one of said jaws in fixed position against the compression of said springs, said springs being operative when said means are released to simultaneously move in opposite directions whereby the topmost spring moves upwardly with respect to said jaws and the lowermost spring carrying said jaws moves said jaws downwardly through the topmost spring.

11. In an animal trap, the combination of a pair of substantially crescent shaped springs normally extending in angular relation with each other, means for holding said springs in operatively assembled relation one above the other comprising a lug on each spring and a base having a slot adapted to receive said lugs, and a pair of jaws pivotally supported on one of said springs and extending through the other of said springs.

12. An animal trap comprising a pair of substantially crescent shaped springs normally extending in angular relation with each other, means for holding said springs in operatively assembled relation one above the other comprising a lug on each spring and a base having a slot adapted to receive said lugs, a pair of jaws pivotally supported on one of said springs and extending through the other of said springs, and means to releasably hold one of said jaws in fixed position against the compression of said springs, said other jaw being adapted to be folded down on said first mentioned jaw or turned away therefrom into substantially parallel relation therewith and with said springs when the trap is set.

13. An animal trap comprising a pair of substantially crescent shaped springs, means for holding said springs in operatively assembled relation one above the other with their free ends normally flaring in opposite directions and comprising a lug on each spring and a base having a slot adapted to receive said lugs, a pair of jaws pivotally supported on one of said springs and extending through the other of said springs, means to releasably hold one of said jaws in fixed position against the compression of said springs, said other jaw being adapted to be folded down on said first mentioned jaw, and means adapted to be engaged over both of said jaws and said compressed springs to hold said jaws when folded on each other and said springs in relatively fixed position independently of said dog.

14. In an animal trap, the combination of a pair of substantially crescent shaped springs respectively flared in opposite directions from their centers toward their ends, a pair of jaws pivoted on one of said springs and extending through the other said jaws being adapted to be folded down into substantially parallel relation with said springs when said springs are compressed together, and means adapted to be engaged over said springs and said jaws operative to limit relative movement between said jaws and said springs.

15. In an animal trap, the combination of a pair of separate substantially crescent shaped springs positioned one above the other, flared in opposite directions and normally contacting at a single point; a lug extending outwardly from the major portion of each spring, a base having an opening adapted to receive said lugs, and a pair of jaws pivotally mounted on one spring and extending through apertures in the other, engagement of the sides of the apertures with said jaws limiting the possible movement of separation of said springs whereby said lugs are operatively retained in said slot.

16. In an animal trap, the combination of a pair of complementary springs positioned one above the other and each provided with a rearwardly extending lug, the uppermost spring normally flaring upwardly from adjacent its lug toward its free ends and the lowermost spring normally flaring downwardly from adjacent its lug toward its free ends, a base comprising an upwardly extending lug having an opening adapted to receive the lugs on the springs, and a pair of complementary jaws supported on the lowermost spring and extending through apertures in the uppermost.

17. In an animal trap, the combination of a pair of substantially crescent shaped springs, means for maintaining said springs in operatively assembled relation one above the other, a pair of jaws pivoted on one of said springs and extending through the other, said jaws being adapted to be folded down into substantially parallel relation with the springs when the latter are compressed together, and means adapted for engagement over the springs and the jaws when so folded to limit relative movement therebetween.

In witness whereof, I have hereunto set my hand this 6th day of June, A. D. 1921.

LEOPOLD C. SCHNEIDER.